No. 764,241. PATENTED JULY 5, 1904.
R. E. HUNT.
MACHINE FOR MAKING POPCORN BALLS OR OTHER CONFECTIONS.
APPLICATION FILED FEB. 15, 1904.
NO MODEL.
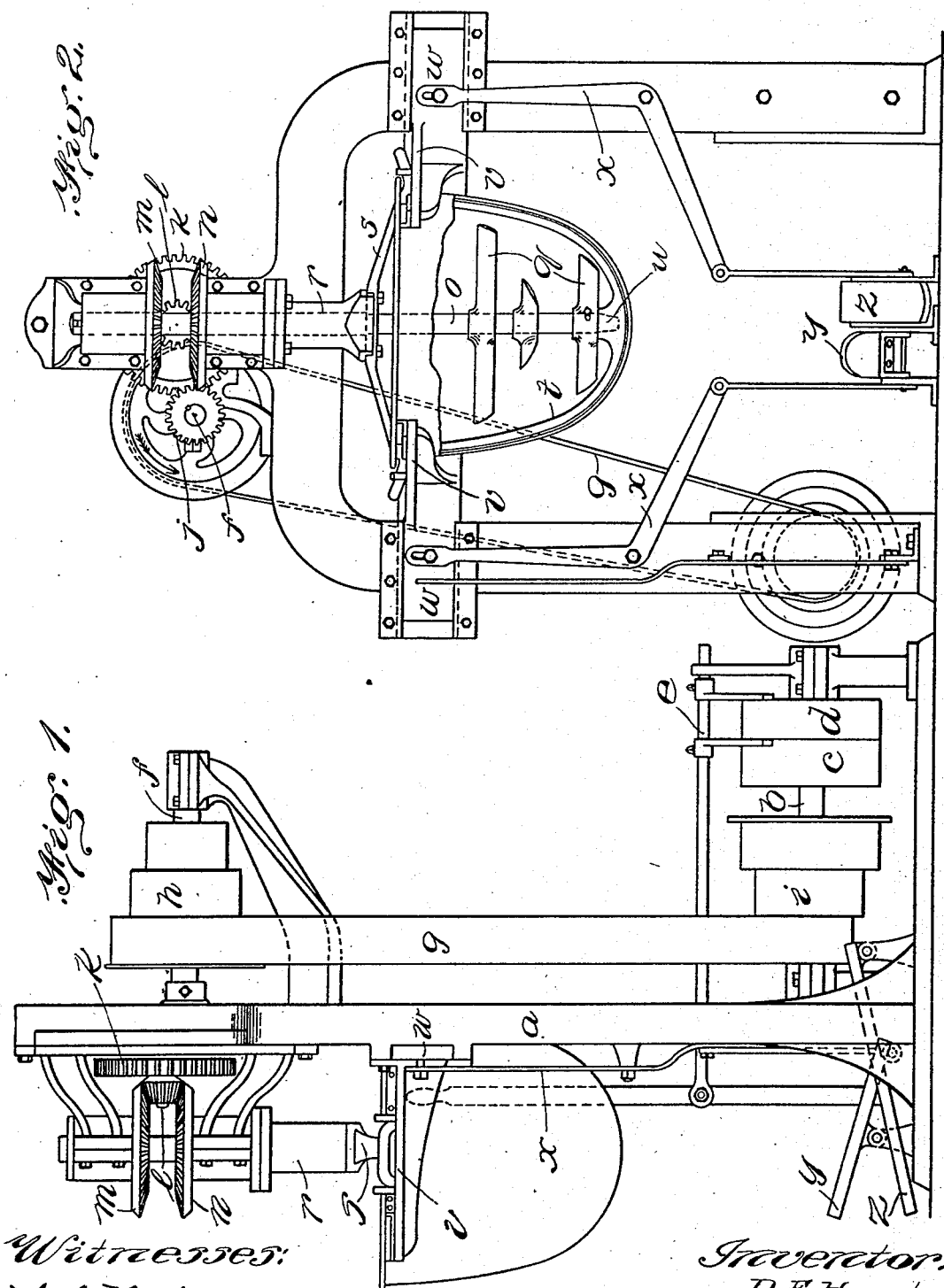
Witnesses:
H. L. Robbins.
E. Batchelder.
Inventor:
R. E. Hunt.
By Wright, Brown & Quinby
Attorneys.

No. 764,241.

Patented July 5, 1904.

UNITED STATES PATENT OFFICE.

RUSSELL E. HUNT, OF FRAMINGHAM, MASSACHUSETTS.

MACHINE FOR MAKING POPCORN BALLS OR OTHER CONFECTIONS.

SPECIFICATION forming part of Letters Patent No. 764,241, dated July 5, 1904.

Application filed February 15, 1904. Serial No. 193,577. (No model.)

*To all whom it may concern:*

Be it known that I, RUSSELL E. HUNT, of Framingham, in the county of Middlesex and State of Massachusetts, have invented certain new and useful Improvements in Machines for Making Popcorn Balls or other Confections, of which the following is a specification.

This invention has relation to means for making popcorn cakes and balls and other confections, and has special reference to devices for stirring substances after they have been brought together for treatment.

In the process of preparing popcorn cakes and balls after the corn and syrup, molasses, or similar substance has been brought together it is necessary to subject the mass to a thorough stirring process, which work is exceedingly laborious and tiresome and comparatively slow.

It is the object of this invention to provide a machine for the purpose mentioned, so that the work can be done by power and even more efficiently than it is now done by hand.

To this end my invention consists of the improvements which I shall now proceed to describe, and point out in the claim.

Reference is to be had to the annexed drawings, and to the letters marked thereon, forming a part of this specification, the same letters designating the same parts or features, as the case may be, wherever they occur.

Of the drawings, Figure 1 is a side view of a corn-stirring machine embodying my invention. Fig. 2 is a front view of the same, partly in section.

In the drawings, $a$ designates the frame of the machine, which may be of the form shown or any other suited to the purpose.

$b$ is the main shaft, upon which there is a fast pulley $c$ and a loose pulley $d$, with a belt-shipping device $e$ for controlling the driving-belt, (not shown,) so as to start and stop the machine.

$f$ is the driving-shaft, which receives motion from the main shaft through the medium of a belt $g$, passing around one of the graduated pulleys $h$ $i$ on said driving and main shafts, respectively, so that the machine may be run faster or slower to suit circumstances. On the inner end of the driving-shaft there is a gear-wheel $j$, which meshes with a gear $k$ on the stud or shaft, of which there is a miter-gear $l$, which meshes with a bevel-gear $m$ above it and a like gear $n$ below it. The gear $m$ is secured to a vertical shaft $o$, which extends down into the kettle $p$, where it is provided with laterally-extended or winged stirrers $q$, having upwardly-inclined upper faces, as shown in Fig. 2. The gear $n$ is secured to a sleeve $r$, through which the shaft $o$ extends. Said sleeve is mounted in suitable bearings and is connected, by means of a yoke $s$, with a scraper and stirrer $t$, which is made to conform substantially to the interior form of the kettle and to work close to the sides and bottom thereof, so as to prevent any of the material from adhering to the kettle, and so escape being stirred. The shaft $o$ is stepped in the lower part of the scraper and stirrer, as at $u$, so that the relationship of the stirrers will be preserved at all times. The upward inclination of the upper faces of the stirrers $q$ operates with a tendency to lift the mass in the kettle, to thoroughly stir it, and keep it from compacting on the bottom. The kettle is supported by its rim upon ledges $v$, connected with slides $w$, guided in suitable ways connected with the frame, so that when the slides and their ledges are moved outward the kettle may be released, but when the slides are moved inward they engage the rim of the kettle and hold it in place.

$x$ designates bell-crank levers fulcrumed on the frame and connected at their upper ends with the slides and at their lower ends through the medium of link-rods with treadles $y$ and $z$ in such manner that by depressing one of said treadles the ledges of the slides may be made to engage the rim of the kettle and by depressing the other the ledges may be disengaged from the kettle. This is an important feature of the invention, since the operator can employ both of his hands in manipulating the kettle, while by a simple movement of the foot it can be in an instant secured in place in or detached from the machine.

It will be observed that the stirrers are constructed and arranged as to scrape syrup or other material from the surf the kettle and mix it with the corn or other substance therein.

I do not limit myself to the use of my invention in the manufacture of popcorn confections, since it is obvious that it may in its entirety or in material and substantial portions thereof be used in the making of other confections.

I claim—

A machine for manufacturing popcorn cakes and balls and other confections comprising in its construction a kettle, stirrers therein, movable ledges for engaging the rim of the kettle, treadles, and mechanism intermediate of the same and the movable ledges to operate the latter, as set forth.

In testimony whereof I have affixed my signature in presence of two witnesses.

RUSSELL E. HUNT.

Witnesses:
C. F. BROWN,
E. BATCHELDER.